(12) United States Patent
Dudgeon et al.

(10) Patent No.: US 9,244,613 B2
(45) Date of Patent: Jan. 26, 2016

(54) VOLUME EXTENT ALLOCATION (71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 13/857,456

(22) Filed: Apr. 5, 2013

(65) Prior Publication Data

US 2014/0304483 A1 Oct. 9, 2014

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .............. *G06F 3/06* (2013.01); *G06F 3/0608* (2013.01); *G06F 3/0631* (2013.01); *G06F 3/0644* (2013.01)

(58) Field of Classification Search
CPC ..... G06F 3/0644; G06F 3/0631; G06F 3/0608
USPC ........................................... 711/162
See application file for complete search history.

(56) References Cited

U.S. PATENT DOCUMENTS

| | | | |
|---|---|---|---|
| 5,897,661 A * | 4/1999 | Baranovsky et al. | 711/170 |
| 6,088,764 A * | 7/2000 | Shyam et al. | 711/112 |
| 7,636,830 B1 * | 12/2009 | Dalal et al. | 711/173 |
| 2007/0113157 A1 | 5/2007 | Perego | |
| 2008/0114963 A1 * | 5/2008 | Cannon et al. | 711/170 |
| 2010/0106933 A1 * | 4/2010 | Kamila et al. | 711/171 |
| 2012/0005449 A1 * | 1/2012 | Reed et al. | 711/171 |

* cited by examiner

*Primary Examiner* — Mark Giardino, Jr.
(74) *Attorney, Agent, or Firm* — Stosch Sabo; Robert Sullivan (57) ABSTRACT

A method of and system for processing an extend request for a data set in a storage facility is disclosed. The method and system may include receiving the extend request. The extend request may include a new extent allocation amount for the data set. The data set may be associated with a number of volumes in the storage facility. The method and system may include apportioning the new extent allocation amount among fractional amounts. The method and system may include allocating the fractional amounts.

10 Claims, 4 Drawing Sheets

VOLUME EXTENT ALLOCATION

TECHNICAL FIELD

This disclosure relates generally to computer-implemented data storage and, more particularly, relates to allocating data sets.

BACKGROUND

The amount of data that needs to be managed by enterprises is growing at an extremely high rate. One challenge facing database management systems is allocating sufficient storage space to accommodate a data set that is expanding in size. A customer of a database management service typically must review their data set compared to a current allocation to ensure that sufficient storage space and logical storage units are available for an addition to the data set.

SUMMARY

A method of and system for processing an extend request for a data set in a storage facility is disclosed. The method and system may include receiving the extend request. The extend request may include a new extent allocation amount for the data set. The data set may be associated with a number of volumes in the storage facility. The method and system may include apportioning the new extent allocation amount among fractional amounts. The method and system may include allocating the fractional amounts.

Aspects of the disclosure include a methodology allowing specific data sets to be able to spread a new extent allocation amount across multiple volumes. Spreading the new extent allocation amount across multiple volumes may allow an extend request to succeed and not disrupt applications. An allocation threshold of a selected Storage Group (SG) may be altered to a higher value. A failed extend request may be repeated. If the extend request still fails, the new extend allocation amount may be spread over (up to) a number of candidate volumes. The number of candidate volumes may be defined in the extending data sets catalog entry. In embodiments, the new extend allocation amount may be spread up to a defined Dynamic Volume Count (DVC) for the data set. If no candidate volumes exist, and the data set is defined with a DVC, the same methodology of spreading the new extent allocation amount across the DVC may be used. If spreading the new extent allocation amount across multiple volumes succeeds, control may be passed back to the application and normal processing may continue. In embodiments, a space management utility may key off a new value. The new value may be a new bit. The space management utility may move data off the multiple volumes to a primary volume for a data set. The multiple volumes may be returned to a candidate status in a catalog.

DETAILED DESCRIPTION

In available database management solutions a data set may be stored in one or more volumes. In each volume a particular database management solution may make allocations known as extents. The maximum number of volumes permitted for a data set may be a predetermined value or may be user specified. When a data set needs to extend to an additional volume, the entire new extent allocation amount must be obtained on a single volume within a Storage Group (SG) of devices. In highly active environments these devices can become fully utilized which can prevent a Storage Management Subsystem (SMS) from extending the data set to another device because no single device in the SG contains enough free space below its defined allocation threshold to satisfy the request. This can lead to application failures which require the additional space in the data set to continue input-output (I/O) processing. Aspects of the disclosure include a methodology allowing specific data sets to be able to spread the new extent allocation amount across multiple volumes. Spreading the new extent allocation amount across multiple volumes may allow an extend request to succeed and not disrupt applications.

Aspects of the disclosure may enable data sets to extend to additional volumes to avoid disrupting an application. An allocation threshold of a selected SG may be altered to a higher value. A failed extend request may be repeated. If the extend request still fails, the new extend allocation amount may be spread over (up to) a number of candidate volumes. The number of candidate volumes may be defined in the extending data sets catalog entry. In embodiments, the new extend allocation amount may be spread up to a defined Dynamic Volume Count (DVC) for the data set. If no candidate volumes exist, and the data set is defined with a DVC, the same methodology of spreading the new extent allocation amount across the DVC may be used. If spreading the new extent allocation amount across multiple volumes succeeds, control may be passed back to the application and normal processing may continue. In embodiments, a space management utility may key off a new value. The new value may be a new bit. The space management utility may move data off the multiple volumes to a primary volume for a data set. The multiple volumes may be returned to a candidate status in a catalog.

Figure 1:
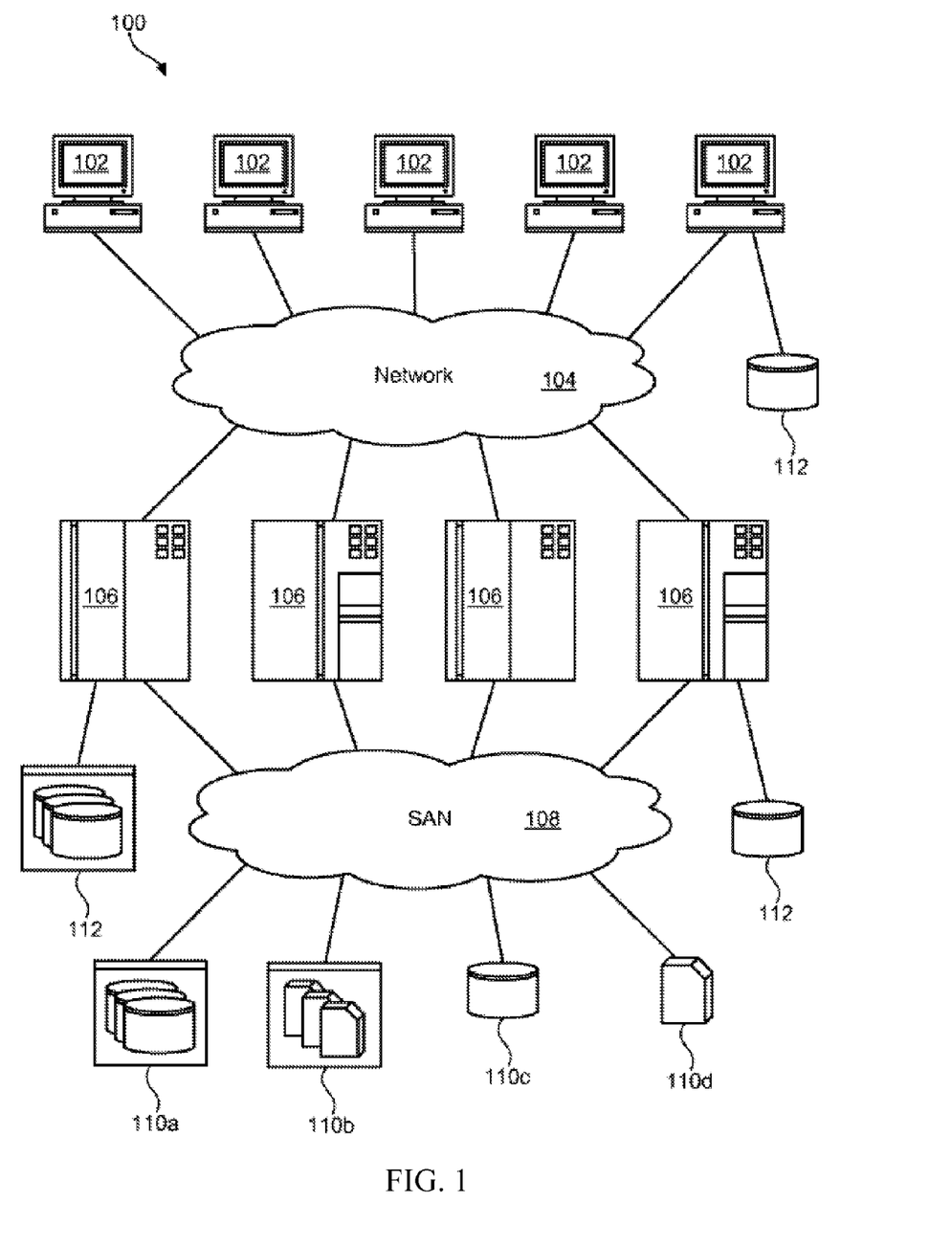
FIG. 1 illustrates an example network architecture according to an embodiment.

FIG. 1 illustrates an example network architecture 100 according to an embodiment. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from allocation techniques of the disclosure.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from allocation techniques according to the disclosure.

Figure 2:
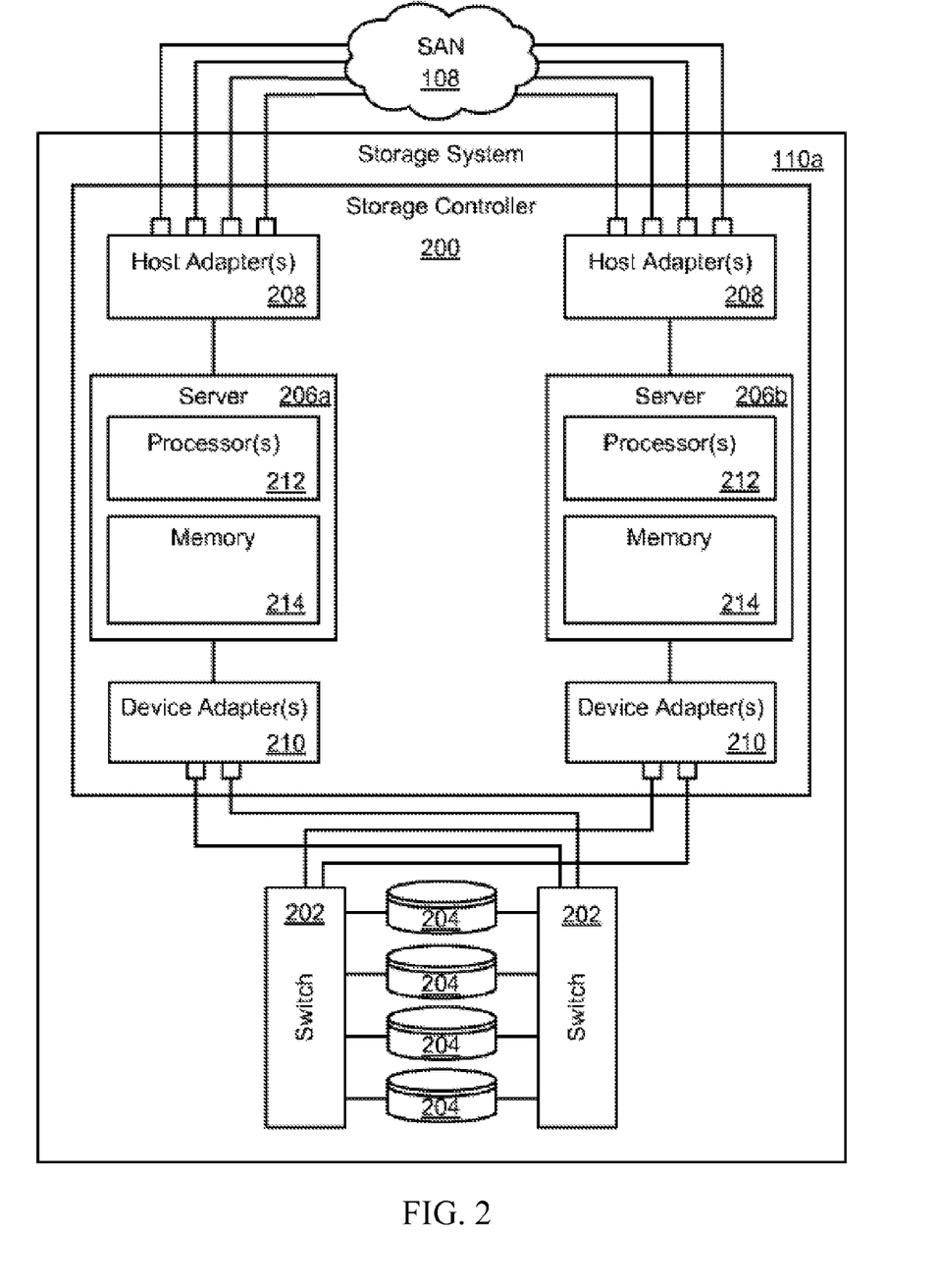
FIG. 2 illustrates an example storage system containing an array of storage devices according to an embodiment.

FIG. 2 illustrates an example storage system 110a containing an array of storage devices 204 (e.g., hard-disk drives 204 and/or solid-state drives 204) according to an embodiment. The internal components of the storage system 110a are shown as allocation techniques according to the disclosure and may be used to allocate data sets for logical volumes residing within such a storage system 110a. Nevertheless, allocation techniques according to the disclosure may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, allocation techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from allocation techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
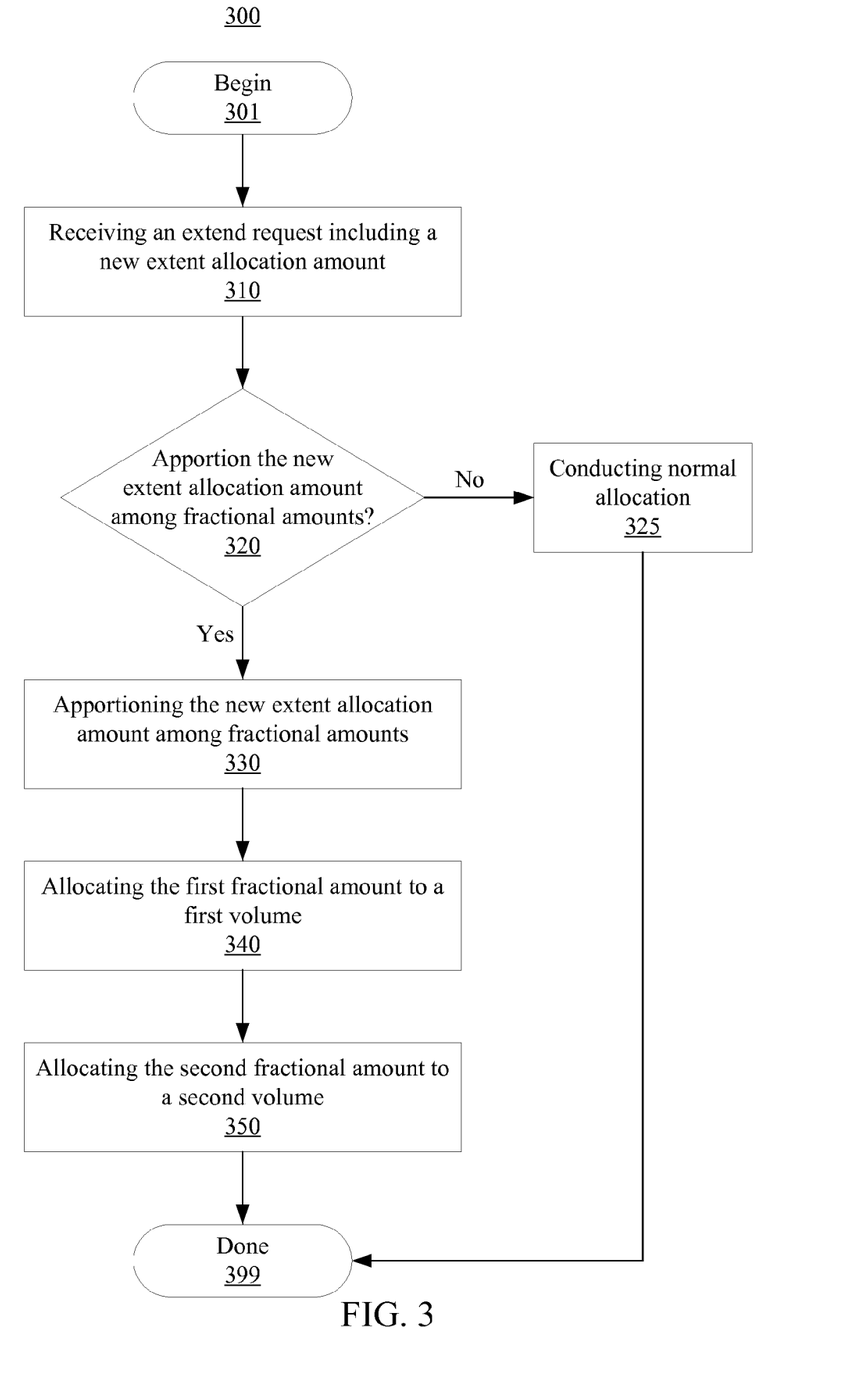
FIG. 3 is a flowchart illustrating an operation processing an extend request according to an embodiment.

FIG. 3 is a flowchart illustrating an operation 300 processing an extend request according to an embodiment. Operation 300 may ensure data sets are more likely able to extend to additional volumes when required by an application. Operation 300 may work on a variety of operating systems. In embodiments, operation 300 may work on database management solutions. Operation 300 may begin at block 301. The extend request may be received at block 310. The extend request may be for a data set. The extend request may include a new extent allocation amount for the data set. The data set may be associated with a number of volumes in a storage facility. The number of volumes may be a predetermined value or may be user specified. The number of volumes may be constrained, for example, by a DVC.

At block 320, a decision may be made whether to spread the new extent allocation amount across multiple volumes. The decision of block 320 may include determining to conduct normal allocation. Normal allocation may be conducted at block 325 and the operation 300 may conclude at block 399. The decision of block 320 may include determining to apportion the new extent allocation amount among fractional amounts. In embodiments, SMS may proceed with a standard volume selection process for data set extend request processing. The standard volume selection process may fail. Failure may occur because no single volume in a selected SG contains enough free space to satisfy the extend request. Put differently, it may be determined that zero of the number of volumes can accommodate the new extent allocation amount. A volume allocation threshold may be associated with the number of volumes. The volume allocation threshold may be a predetermined value or may be user specified. The volume allocation threshold (allocation/migration threshold) of the selected SG may be altered. The alteration may be dynamic. For example, in an SMS environment Storage Groups may be defined with the volume allocation threshold set to a default value of 85%. In the example, if a request on a volume will cause the percent of used space on the volume to exceed its threshold, the request as to that volume is rejected. The alteration may set the volume allocation threshold to a higher value. The alteration may be user defined. For example, the volume allocation threshold may be altered so as to be set at 90%. The extend request may proceed again with the standard volume selection process, just at a different volume allocation threshold. Failure may once again occur as it may be determined that still zero of the number of volumes can accommodate the new extent allocation amount.

Operation 300 may spread the new extent allocation amount across multiple volumes. Spreading the new extent allocation amount across multiple volumes may allow an extend request to succeed and not disrupt applications. The new extent allocation amount may be apportioned among fractional amounts at block 330. The fractional amounts may include at least a first fractional amount and at least a second fractional amount. More fractional amounts are considered (e.g., a third fractional amount). The first fractional amount may be allocated to a first volume at block 340. The second fractional amount may be allocated to a second volume at block 350. In embodiments, the fractional amounts may be divided so that the fractional amounts are not too small or too large. In embodiments, the fractional amounts may be divided so that the fractional amounts are associated with free space in particular volumes. In embodiments, the new extent allocation amount may be apportioned among fractional amounts and allocated to any plurality of volumes up to the operating system limit (e.g., 59 for one particular database management solution).

In embodiments, the new extent allocation amount may be spread over (up to) a number of candidate volumes following failure occurring subsequent to altering the volume allocation. If no candidate volumes exist, and the data set is defined with a DVC, the same methodology of spreading the new extent allocation amount across the DVC may be used. The number of candidate volumes may be defined in the extending data sets catalog entry. In embodiments, the new extend allocation amount may be spread up to the number of volumes defined in the DVC of the data set in a Data Class. SMS may drive Direct Access Device Space Management (DADSM) to satisfy the extend request up to the number of candidate volumes or DVC. Any candidate volumes not required to satisfy the extend request may be immediately returned to a candidate status in the catalog entry.

Operation 300 may conclude at block 399. It may be determined that at least one of the number of volumes can accommodate the new extent allocation amount. If spreading the new extent allocation amount across multiple volumes succeeded, control may be passed back to the application and normal processing may continue. It may be determined that zero of the number of volumes can accommodate the new extent allocation amount. If spreading the new extent allocation amount across multiple volumes failed, the extend request may be considered failed and appropriate error messages may be returned to the application.

In embodiments, a space management utility may key off an indicator or a new value. The new value may be a new bit. The new bit may be defined, for example, in the catalog entry for the data set. The new bit may indicate which volumes were utilized to store fractional amounts by operation 300. Thus, after allocating the new extent allocation amount, it may be determined that a third volume can accommodate the new extent allocation amount. The first and second fractional amounts may be reallocated to the third volume. The third volume may be a primary volume. Therefore, the space management utility may move data stored in fractional amounts in the number of volumes by operation 300 to a primary volume for a data set. The volumes utilized to store fractional amounts by operation 300 may be returned to a candidate status in a catalog.

Figure 4:
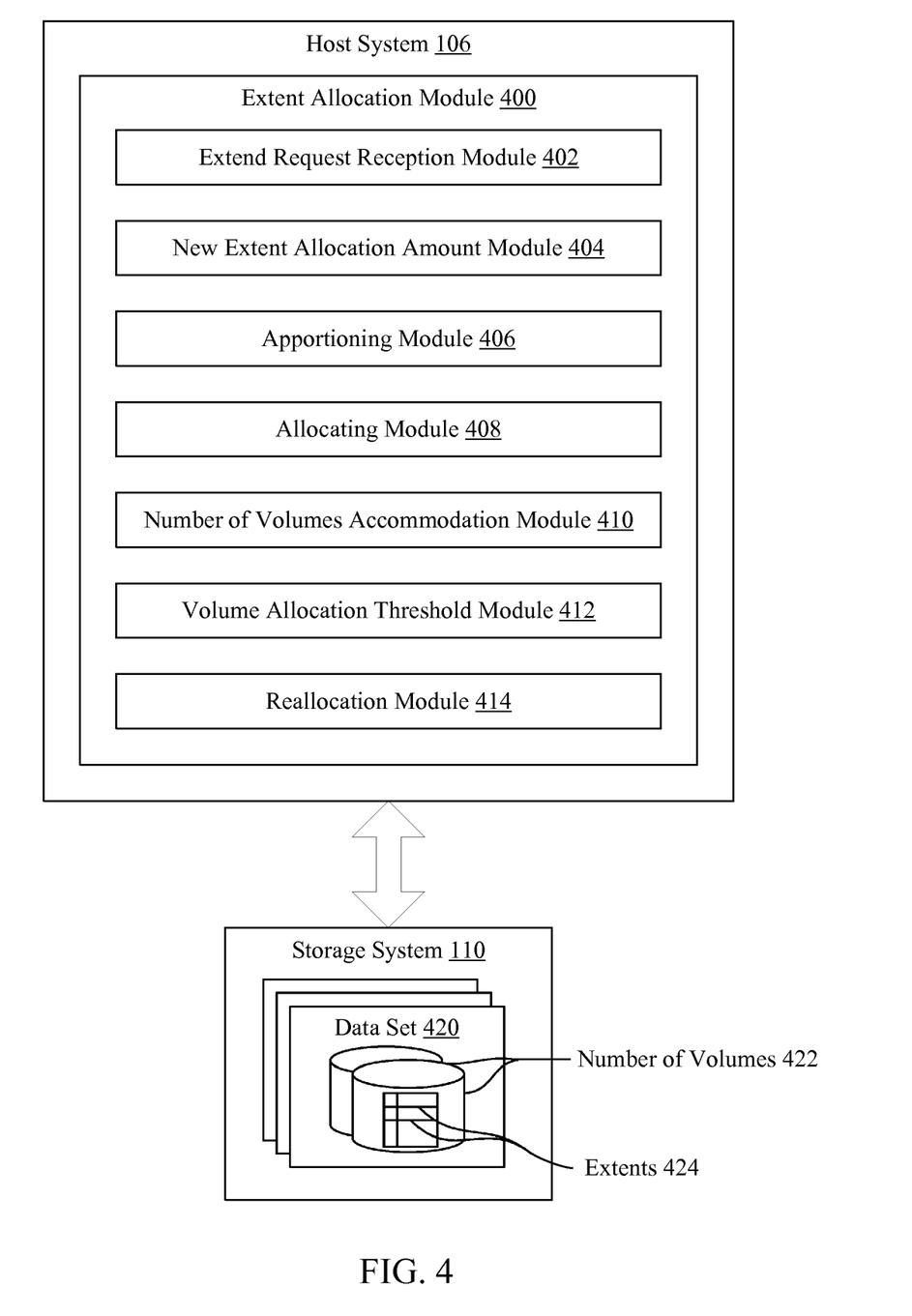
FIG. 4 shows modules of a system implementing an operation according to an embodiment.

FIG. 4 shows modules of a system implementing operation 300 according to an embodiment. In embodiments, operation 300 may be implemented in the form of one or more modules. These modules may be implemented in hardware, software or firmware executable on hardware, or a combination thereof. For example, module functionality may occur in a host system 106 may actually be implemented in a storage system 110 and vice versa. Other functionality may be distributed across the host system 106 and the storage system 110.

A host system 106 may include an extent allocation module 400. The extent allocation module 400 may facilitate management of a storage system 110 hosting a data set 420 comprising a number of volumes 422 adapted to have extents 424. The extent allocation module 400 may include an extend request reception module 402, a new extent allocation amount module 404, an apportioning module 406, an allocating module 408, a number of volumes accommodation module 410, a volume allocation threshold module 412, and a reallocation module 414.

The extend request reception module 402 may receive particular extend requests which may be for data sets. The new extent allocation amount module 404 may be associated with the extend request reception module 402 and may be represented as values received as part of particular extend requests. The apportioning module 406 may decide to spread the new extent allocation amount across multiple volumes and may apportion new extent allocation amounts among fractional amounts. The allocating module 408 may allocate the fractional amounts to the number of volumes. The number of volumes accommodation module 410 may determine how many of the number of volumes can accommodate the new extent allocation amounts of particular extend requests. The volume allocation threshold module 412 may alter the volume allocation threshold to attempt to satisfy particular extend requests by standard volume selection processes. The reallocation module 414 may use space management utilities to move data stored in fractional amounts in the number of volumes to primary volumes.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method of processing an extend request for a data set in a storage facility, comprising:
receiving the extend request, the extend request including a new extent allocation amount for the data set, the data set associated with a number of volumes in the storage facility, wherein the number of volumes includes at least a first volume, a second volume, and a third volume, wherein at least one of the first volume and the second volume is associated with a dynamic volume count (DVC) and is not a candidate volume of the data set, wherein the third volume is not associated with the DVC and is a primary volume or a candidate volume of the data set;
increasing a total percentage of space of each volume which may be used for extent allocations;
apportioning the new extent allocation amount among fractional amounts, the fractional amounts including at least a first fractional amount and at least a second fractional amount;
allocating the first fractional amount to the first volume;
allocating the second fractional amount to the second volume;
determining, after allocating the first and second fractional amounts, that the third volume can accommodate the new extent allocation amount; and
reallocating the first and second fractional amounts to the third volume.

2. The method of claim 1, wherein increasing the total percentage of space of each volume which may be used for extent allocations further comprises: determining that zero of the number of volumes can accommodate the new extent allocation amount and in response to determining that zero of the number of volumes can accommodate the new extent allocation amount, increasing a volume allocation threshold, wherein the volume allocation threshold is associated with the number of volumes and indicates the total percentage of space of each volume which may be used for extent allocations.

3. The method of claim 1, wherein apportioning the new extent allocation amount among fractional amounts further comprises: in response to increasing the total percentage of space of each volume which may be used for extent allocations, determining that zero of the number of volumes can accommodate the new extent allocation amount and apportioning the new extent allocation amount among fractional amounts.

4. The method of claim 1, wherein the third volume and the first volume are the same volume.

5. The method of claim 1, wherein reallocating the first and second fractional amounts to the third volume comprises:
allocating the first fractional amount to the third volume;
allocating the second fractional amount to the third volume;
deallocating the first fractional amount from the first volume; and
deallocating the second fractional amount from the second volume.

6. The method of claim 1, wherein apportioning the new extent allocation amount among fractional amounts comprises apportioning the new extent allocation amount among at least the first fractional amount, at least the second fractional amount, and at least a third fractional amount, the method further comprising:
allocating the third fractional amount to the third volume.

7. A computer-implemented method of processing an extend request for a data set in a storage facility, comprising:
receiving the extend request, the extend request including a new extent allocation amount for the data set, the data set associated with a number of volumes in the storage facility, wherein the number of volumes includes at least a first volume, a second volume, and a third volume, wherein at least one of the first volume and the second volume is associated with a dynamic volume count (DVC) and is not a candidate volume of the data set, wherein the third volume is not associated with the DVC and is a primary volume or a candidate volume of the data set;
determining that zero of the number of volumes can accommodate the new extent allocation amount;
increasing a volume allocation threshold, wherein the volume allocation threshold indicates the total percentage of space of each volume which may be used for storage of data sets;
determining, after increasing the volume allocation threshold, that no single volume of the number of volumes can accommodate the new extent allocation amount with the increased volume allocation threshold;
in response to determining that no single volume of the number of volumes can accommodate the new extent allocation amount with the increased volume allocation threshold, apportioning the new extent allocation amount among fractional amounts, the fractional amounts including at least a first fractional amount and at least a second fractional amount;
allocating the first fractional amount to the first volume;
allocating the second fractional amount to the second volume;
determining, after allocating the first and second fractional amounts, that the third volume can accommodate the new extent allocation amount; and
reallocating the first and second fractional amounts to the third volume.

8. A system for processing an extend request for a data set comprising:
a storage system; and
a host system including a processor, the processor configured to:
receive the extend request, the extend request including a new extent allocation amount for the data set, the data set associated with a number of volumes in the storage system, wherein the number of volumes includes at least a first volume, a second volume, and a third volume, wherein at least one of the first volume and the second volume is associated with a dynamic volume count (DVC) and is not a candidate volume of the data set, wherein the third volume is not associated with the DVC and is a primary volume or a candidate volume of the data set;
determine that no single volume contains enough free space to satisfy the extend request;
increase a volume allocation threshold, wherein the volume allocation threshold indicates the total percentage of space of each volume which may be used for extent allocations;
determine that no single volume with the increased volume allocation threshold can accommodate the new extent allocation amount;
apportion the new extent allocation amount among fractional amounts, the fractional amounts including at least a first fractional amount and at least a second fractional amount;
allocate the first fractional amount to the first volume;

allocate the second fractional amount to the second volume;

determine, after allocating the first and second fractional amounts, that the third volume can accommodate the new extent allocation amount; and reallocate the first and second fractional amounts to the third volume.

9. The system of claim 8, wherein the third volume and the first volume are the same volume.

10. The system of claim 8, wherein apportion the new extent allocation amount among fractional amounts comprises apportioning the new extent allocation amount among at least the first fractional amount, at least the second fractional amount, and at least a third fractional amount, the method wherein the extent allocation module is further configured to:

allocate the third fractional amount to the third volume.

* * * * *